United States Patent
Zhang et al.

(10) Patent No.: US 9,794,076 B2
(45) Date of Patent: Oct. 17, 2017

(54) METHOD FOR NODE DEVICE TO ENTER OR EXIT POWER-SAVING MODE AND NODE DEVICE

(71) Applicant: ZTE CORPORATION, Shenzhen, Guangdong Province (CN)

(72) Inventors: Weiliang Zhang, Shenzhen (CN); Mingming Cheng, Shenzhen (CN); Liquan Yuan, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 14/416,704

(22) PCT Filed: Aug. 22, 2013

(86) PCT No.: PCT/CN2013/082097
§ 371 (c)(1),
(2) Date: Jan. 23, 2015

(87) PCT Pub. No.: WO2014/117505
PCT Pub. Date: Aug. 7, 2014

(65) Prior Publication Data
US 2015/0333919 A1   Nov. 19, 2015

(30) Foreign Application Priority Data

Feb. 1, 2013   (CN) .......................... 2013 1 0043533

(51) Int. Cl.
*H04L 12/26* (2006.01)
*H04L 12/16* (2006.01)
(Continued)

(52) U.S. Cl.
CPC ............ *H04L 12/12* (2013.01); *G06F 1/3203* (2013.01); *H04L 43/08* (2013.01); *H04M 19/08* (2013.01); *Y02B 60/34* (2013.01); *Y02B 60/50* (2013.01)

(58) Field of Classification Search
CPC ....... H04L 12/12; H04L 43/08; G06F 1/3203; H04M 19/08; Y02B 60/34
See application file for complete search history.

(56) References Cited

U.S. PATENT DOCUMENTS 8,601,289 B1 * 12/2013 Smith ..................... H04L 12/10
713/300
2005/0258880 A1 * 11/2005 Jung ..................... G11C 5/143
327/143

(Continued)

FOREIGN PATENT DOCUMENTS

| CN | 102651664 A | 8/2012 |
| CN | 102740437 A | 10/2012 |
| EP | 2552084 A1 | 1/2013 |

OTHER PUBLICATIONS

XP014064492; Access, Terminals, Transmission and Multiplexing(ATTM); Reverse Power Feed for Remote Nodes; ETSI TR 102 629 N2.1.2 (Mar. 2011).

*Primary Examiner* — Kiet Tang
(74) *Attorney, Agent, or Firm* — Ling Wu; Stephen Yang; Ling and Yang Intellectual Property

(57) ABSTRACT

A method for a node device to enter or exit a power-saving mode and a node device are disclosed. The method for a node device to enter a power-saving mode includes: the node device detecting characteristics of a reverse power supply signal provided by a customer premise equipment, and if a condition of entering a power-saving mode is satisfied, the node device entering the power-saving mode. The method for a node device to exit a power-saving mode includes: the (Continued)

node device in a power-saving mode exiting the power-saving mode after detecting that a customer premise equipment starts reverse power supply to the node device. The node device includes a reverse power supply unit, a power source unit, a control unit, and a transceiver unit.

9 Claims, 2 Drawing Sheets

(51) Int. Cl.
*H04B 17/00* (2015.01)
*G06F 1/00* (2006.01)
*H03L 7/00* (2006.01)
*H02J 7/00* (2006.01)
*H04L 12/12* (2006.01)
*G06F 1/32* (2006.01)
*H04M 19/08* (2006.01)

(56) References Cited

U.S. PATENT DOCUMENTS

| | | | |
|---|---|---|---|
| 2008/0025721 A1* | 1/2008 | Wynman | H04J 3/14 |
| | | | 398/38 |
| 2010/0001586 A1* | 1/2010 | Bernard | H02J 9/061 |
| | | | 307/65 |
| 2010/0111523 A1* | 5/2010 | Hirth | H04B 10/27 |
| | | | 398/25 |
| 2010/0172276 A1 | 7/2010 | Aragon | |
| 2011/0107116 A1 | 5/2011 | Diab et al. | |
| 2012/0075992 A1* | 3/2012 | Shahidi | H04B 1/036 |
| | | | 370/235 |

\* cited by examiner

METHOD FOR NODE DEVICE TO ENTER OR EXIT POWER-SAVING MODE AND NODE DEVICE

TECHNICAL FIELD

The present document relates to the field of communications, and in particular, to a method for a node device to enter and exit a power-saving mode and a node device.

BACKGROUND OF THE RELATED ART

The Fiber To The Home (FTTH) can provide a service rate in an order of Gigabit to a user, which is considered as an optimal realization form for future broadband access. However, in actual deployment, there are many bottlenecks for the FTTH, for example, problems such as a high construction cost, difficult wiring, and legal disputes etc. Many operators have realized that in some scenarios optical fibers will terminate at a distance of about 100 meters away from the user, and the original copper wire resources will be reused in "last 100 meters" of the user, and broadband access is implemented through a Digital Subscriber Line (DSL) or other copper wire access technology. A termination point of the fiber is a distribution point, and therefore, such application scenario is referred to as a Fiber To The Distribution Point (FTTDP for short).

The application scenario of the FTTDP is as shown in FIG. 1. The DP device (i.e., node device) is typically deployed in places such as a basement of a room, an inlet connecting hole, an outdoor wall etc. In such places, electricity acquisition of a node device is a big problem. As the node device is close to the user, it may be considered to inversely supply power from a Customer Premise Equipment (CPE for short) to the node device. Support for reverse power supply is used as a particular requirement under the FTTDP application scenario, and at the same time, power supply for a single-path user is required, which can ensure normal operation of the node device.

The node device is required to have low power consumption, and at the same time, in order to better support reverse power supply and based on reasons such as environmental protection and economy, it also requires the node device to support the power-saving mode. One power-saving method thereof is as follows: in some period of time, a user will stop using data services, and at this time, the CPE enters a power-saving mode or power thereof will be turned off. As at this time there will be a long time during which no data transmission is on the link, which may reaches orders of hours, a port corresponding to the node device may stop operation and enter a power-saving mode.

There are many power-saving modes for the node device. One is a nap mode, in which the node device stops data transmission, but it needs to open a receiving function, to receive the CEP data and then wake up. Another is a period sleep mode, in which the node device may stop transceiving, but it needs to wake up timely to detect conditions of data transceiving on the line. In order to enable the node device to wake up in time, these two modes both need to enable the node device to maintain the receiving function to be turned on or wake up timely, and the node device can not to enter a complete sleep state. Therefore, the effect of power-saving is not good, especially when the user stop using the data services for a long time. In addition, the manners for controlling the node device to enter or exit the power-saving mode are also very tedious.

SUMMARY

The embodiments of the present invention propose methods for a node device to enter or exit a power-saving mode and a node device, to simplify the processes of the node device entering a power-saving mode and exiting a power-saving mode, and improve the effects of power-saving for the node device.

The embodiments of the present invention provide a method for a node device to enter a power-saving mode, comprising:

the node device detecting characteristics of a reverse power supply signal provided by a customer premise equipment, and if a condition of entering a power-saving mode is satisfied, the node device entering the power-saving mode.

Alternatively, the step of the node device entering the power-saving mode comprises: the node device turning off a transceiver of a port on the node device corresponding to the customer premise equipment.

Alternatively, the condition of entering a power-saving mode comprises the node device detecting that the reverse power supply signal provided by the customer premise equipment disappears.

Alternatively, the method further comprises:

when there is no service on a link for a period of time, a customer premise equipment corresponding to the link stopping providing the reverse power supply signal to the node device.

Alternatively, the method further comprises:

when there is no service on a link for a period of time, a customer premise equipment corresponding to the link reducing a level of power consumption of the power supply to the node device; wherein, the condition of entering a power-saving mode comprises the node device detecting that power of the reverse power supply of the customer premise equipment reduces.

Alternatively, the method further comprises:

when there is no service on a link for a period of time, a customer premise equipment corresponding to the link providing the reverse power supply signal to the node device intermittently according to a certain rule; wherein, the condition of entering a power-saving mode comprises the node device detecting that a period of the reverse power supply of the customer premise equipment changes.

Correspondingly, the embodiments of the present invention further provide a method for a node device to exit a power-saving mode, comprising:

the node device in a power-saving mode exiting the power-saving mode after detecting that a customer premise equipment starts reverse power supply to the node device.

Alternatively, the step of the node device detecting that a customer premise equipment starts reverse power supply to the node device comprises:

the node device detecting that a reverse power supply voltage signal or a reverse power supply current signal provided by the customer premise equipment gradually rises, and rated power is output stably and continuously.

Alternatively, the method further comprises:
after the node device which exits the power-saving mode activates a port corresponding to the customer premise equipment, entering a normal operating mode through an initialization process.

Correspondingly, the embodiments of the present invention further provide a node device, comprising: a reverse power supply unit, a power source unit, a control unit, and a transceiver unit, wherein, the reverse power supply unit is configured to transfer a received reverse power supply signal provided by a customer premise equipment to the power source unit;

the control unit is configured to transmit a turn off command to the transceiver unit when detecting that characteristics of the reverse power supply signal provided by the customer premise equipment in the reverse power supply unit satisfy a condition of entering a power-saving mode; and the transceiver unit is configured to stop data transceiving of a port corresponding to the customer premise equipment after receiving the turn off command.

Alternatively, the condition of entering a power-saving mode comprises:

the control unit detecting that the reverse power supply signal provided by the customer premise equipment disappears; or the control unit detecting that power of the reverse power supply of the customer premise equipment reduces; or the control unit detecting that a period of the reverse power supply of the customer premise equipment changes.

Alternatively, the control unit is further configured to transmit a turn on command to the transceiver unit after detecting that the customer premise equipment starts reverse power supply to the node device in a power-saving mode; and the transceiver unit is further configured to enable data transceiving of a port corresponding to the customer premise equipment after receiving the turn on command.

Alternatively, the control unit is configured to detect that the customer premise equipment starts reverse power supply to the node device in a power-saving mode by the following way:

the control unit detecting that a reverse power supply voltage signal or a reverse power supply current signal provided by the customer premise equipment gradually rises, and rated power is output stably and continuously.

After using the schemes of the embodiments of the present invention, the problem of activation after the port corresponding to the node device enters a power-saving mode is solved, and the process of the node device entering and exiting the power-saving mode is also simplified at the same time.

PREFERRED EMBODIMENTS OF THE PRESENT INVENTION

The embodiments of the present invention will be described in detail below in conjunction with accompanying drawings. It should be illustrated that without conflict, the embodiments in the present application and the features in the embodiments could be combined with each other randomly.

When the CPE terminal is powered off, the reverse power supply is stopped, and once the node device detects that the reverse power supply is stopped, the node device immediately enters a power-saving mode, the transceiver is turned off, and a local battery is used to maintain minimum power consumption or even no operation is performed. Until the CPE is powered on again, the reverse power supply is recovered.

When the CPE enters a power-saving mode, the reverse power supply may be stopped, or reverse power supply is maintained in a low power consumption level, or reverse power supply is performed periodically. The latter two cases may maintain a certain degree of power supply for the node device, thereby avoiding the node device from being powered off completely due to the exhaustion of the battery. The mode of the reverse power supply may be decided by negotiation between both parties. When the CPE enters a power-saving mode, the node device also enters a complete sleep state. When the CPE exits a power-saving mode, the reverse power supply is recovered completely, and only when the node device detects that the reverse power supply is recovered completely, a wake-up process is triggered, and the communication with the CPE is recovered.

When the CPE is powered on again or is recovered from a power-saving state, reverse power supply to the node device is restarted, and may be identified by the node device according to different characteristics of the reverse power supply (such as different voltages, currents and power levels, and different periods of power supply etc.).

Figure 1:
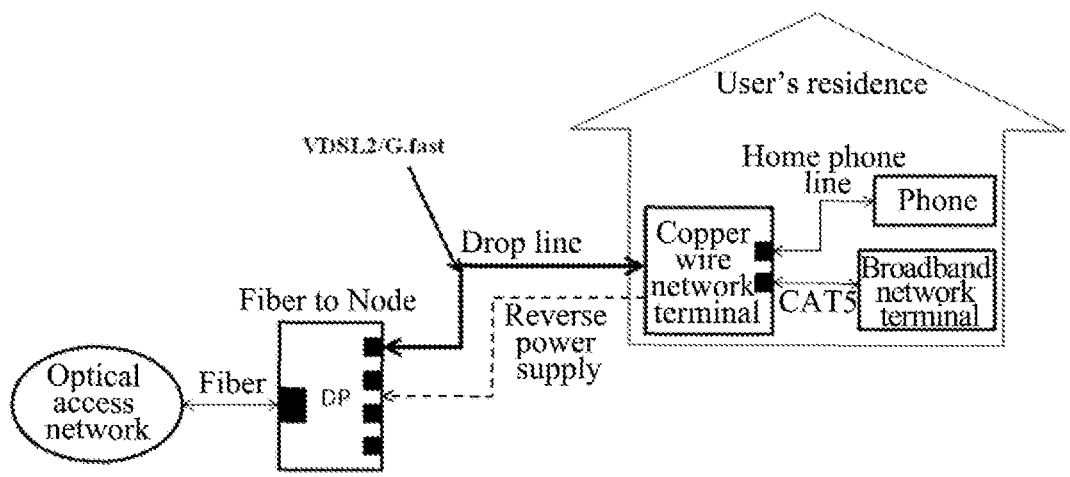
FIG. 1 is a structural diagram of a FTTDP.
Figure 2:
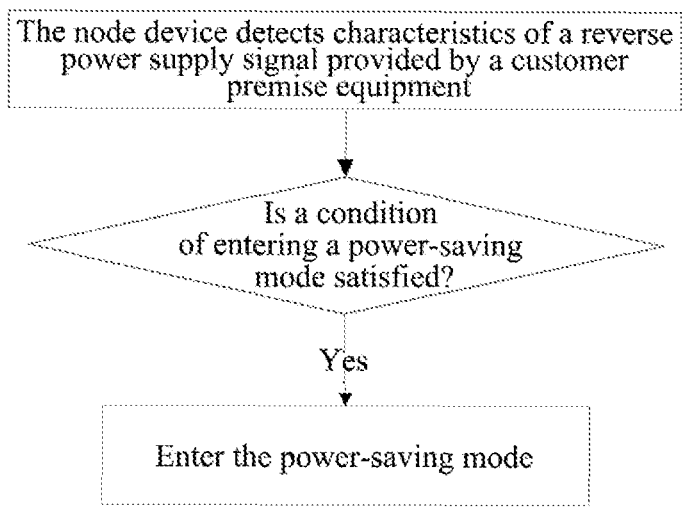
FIG. 2 is a flowchart of a method for a node device to enter a power-saving mode according to an embodiment of the present invention.

In the present embodiment, a method for a node device to enter a power-saving mode, as shown in FIG. 2, comprises:

the node device detecting characteristics of a reverse power supply signal provided by a customer premise equipment, and if a condition of entering a power-saving mode is satisfied, the node device entering the power-saving mode, and turning off a transceiver of a port on the node device corresponding to the customer premise equipment.

In an implementation, the condition of entering a power-saving mode comprises:

the node device detecting that the reverse power supply signal provided by the customer premise equipment disappears; or the node device detecting that power of the reverse power supply of the customer premise equipment reduces; or the node device detecting that a period of the reverse power supply of the customer premise equipment changes.

A method for a node device to exit a power-saving mode comprises:

the node device in a power-saving mode exiting the power-saving mode after detecting that a customer premise equipment starts reverse power supply to the node device.

The implementations of the present document will be described in detail below using three application examples.

Application Example One

In the present application example, a node device entering or exiting a power-saving mode according to whether there is a reverse power supply signal comprises the following steps.

In step one, a user enters a sleep time, and after the customer premise equipment detects that there is a period of time (Ti) during which no data transmission is on a link, the customer premise equipment enters a low power consumption mode.

In step two, when the customer premise equipment is in the low power consumption mode, the transceiver is turned off, and transmits a control signal S1 to an adapter of the customer premise equipment.

In step three, after the adapter receives the control signal S1, a switch for input of an Alternating Current/Direct Current (AC/DC) circuit is converted from an on state to an off state, and the adapter stops inputting a DC reverse power supply voltage signal to a twisted pair. Alternatively, as the user turns off the power source of the customer premise equipment, it results in the customer premise equipment not being able to provide a DC reverse power supply voltage signal to the twisted pair.

In step four, the node device detects that the input voltage of a port on the local device corresponding to the customer premise equipment gradually reduces until 0.

In step five, the node device controls the above port to enter a power-saving mode, and controls the port to stop data transceiving.

In step six, after the customer premise equipment exits the power-saving mode, the transceiver is turned on, and transmits a control signal S3 to the adapter of the customer premise equipment.

In step seven, after the adapter of the customer premise equipment receives the control signal S3, the switch of input of the AC/DC circuit is converted from an off state to an on state, and the adapter starts inputting a DC reverse power supply voltage signal to the twisted pair.

In step eight, the node device detects that the input voltage of the port on the local device corresponding to the customer premise equipment gradually increases until the reverse power supply voltage is stably output.

In step nine, the node device activates the above port.

In step ten, after the customer premise equipment and the node device complete the initialization process successfully, it enters a normal operating mode.

Application Example Two

In the present application example, a node device entering or exiting a power-saving mode according to other characteristics of reverse power supply comprises the following steps.

In step one, a user enters a sleep time, and after the customer premise equipment detects that there is a period of time (Ti) during which no data transmission is on a link, the customer premise equipment enters a low power consumption mode.

In step two, when the customer premise equipment is in the low power consumption mode, the transceiver is turned off, and transmits a control signal S1 to an adapter of the customer premise equipment.

In step three, after the adapter receives the control signal S1, the adapter reduces the power of the reverse power supply, or changes to intermittent power supply (it is in accordance with a certain rule, and power-off and power-on are alternative).

In step four, the node device detects that the input power of a port on the local device corresponding to the customer premise equipment reduces or a period of the power supply changes.

In step five, the node device controls the above port to enter a power-saving mode, and controls the port to stop data transceiving.

In step six, after the customer premise equipment exits the power-saving mode, the transceiver is turned on, and transmits a control signal S3 to the adapter of the customer premise equipment.

In step seven, after the adapter of the customer premise equipment receives the control signal S3, the adapter increases the power supply to a normal level, or changes to continuous power supply.

In step eight, the node device detects that the input power of the port on the local device corresponding to the customer premise equipment increases to a normal level, or the power supply changes to be continuous.

In step nine, the node device activates the above port.

In step ten, after the customer premise equipment and the node device complete the initialization process successfully, it enters a normal operating mode.

Application Example Three

In the present application example, enabling a node device to enter or exit a power-saving mode according to an activation signal comprises the following steps.

In step one, a user enters a sleep time, and after the customer premise equipment detects that there is a period of time (Ti) during which no data transmission is on a link, the customer premise equipment enters a low power consumption mode.

In step two, when the customer premise equipment is in the low power consumption mode, the transceiver is turned off, and transmits a control signal S1 to a port corresponding to the node device.

In step three, after the node device receives the control signal S1, the node device controls a port on the local device corresponding to the customer premise equipment to enter a power-saving mode, and controls the port to stop data transceiving.

In step four, after the customer premise equipment exits the power-saving mode, the transceiver is turned on, and transmits a control signal S3 to the port corresponding to the node device.

In step five, after the node device detects the control signal S3, the node device activates the above port.

In step six, after the customer premise equipment and the node device complete the initialization process successfully, it enters a normal operating mode.

Figure 3:
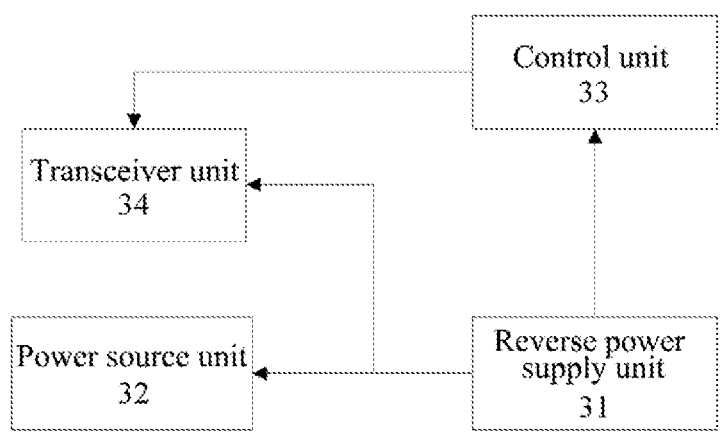
FIG. 3 is a structural diagram of a node device according to an embodiment of the present invention.

In the present embodiment, a node device, as shown in FIG. 3, comprises: a reverse power supply unit 31, a power source unit 32, a control unit 33, and a transceiver unit 34, wherein, the reverse power supply unit 31 is configured to transfer a received reverse power supply signal provided by a customer premise equipment to the power source unit 32;

the control unit 33 is configured to transmit a turn off command to the transceiver unit 34 when detecting that characteristics of the reverse power supply signal provided by the customer premise equipment in the reverse power supply unit 31 satisfy a condition of entering a power-saving mode; and the transceiver unit 34 is configured to stop data transceiving of a port corresponding to the customer premise equipment after receiving the turn off command.

Alternatively, the condition of entering a power-saving mode comprises:

the control unit detecting that the reverse power supply signal provided by the customer premise equipment disappears; or the control unit detecting that power of the reverse power supply of the customer premise equipment reduces; or the control unit detecting that a period of the reverse power supply of the customer premise equipment changes.

Alternatively, the control unit 33 is further configured to transmit a turn on command to the transceiver unit 34 after detecting that the customer premise equipment starts reverse power supply to the node device in a power-saving mode; and the transceiver unit 34 is further configured to enable data transceiving of a port corresponding to the customer premise equipment after receiving the turn on command.

Alternatively, the control unit 33 is configured to detect that the customer premise equipment starts reverse power supply to the node device in a power-saving mode by the following way:

the control unit 33 detecting that a reverse power supply voltage signal or a reverse power supply current signal provided by the customer premise equipment gradually rises, and rated power is output stably and continuously.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The embodiments of the present invention are not limited to any particular form of a combination of hardware and software.

The above description is only the preferred embodiments of the present invention and it is not intended to limit the protection scope of the present document. According to the inventive contents of the present document, there may be many other embodiments. Those skilled in the related art can make various corresponding modifications and variations according to the embodiments of the present invention, without departing from the spirit and essence thereof of the present document. Any modification, equivalent substitution and improvement made within the spirit and principle of the present document should be included within the protection scope of the present document.

INDUSTRIAL APPLICABILITY

After using the schemes of the embodiments of the present invention, the problem of activation after the port corresponding to the node device enters a power-saving mode is solved, and the process of the node device entering and exiting the power-saving mode is also simplified at the same time.

What is claimed is:

1. A method for a node device to enter and exit a power-saving mode, comprising:

the node device detecting characteristics of a reverse power supply signal provided by a customer premise equipment, and if the characteristics of the reverse power supply signal satisfy a condition of entering a power-saving mode, the node device entering the power-saving mode; wherein the reverse power supply signal provided by the customer premise equipment is used to provide reverse power supply to the node device;

wherein the characteristics of the reverse power supply signal comprise one or more of a current level, a power level, and a period of the reverse power supply signal;

when there is no service on a link for a period of time, the customer premise equipment corresponding to the link reducing a level of power consumption of the power supply to the node device; wherein, the condition of entering the power-saving mode comprises the node device detecting that power of the reverse power supply of the customer premise equipment reduces;

the method further comprising:

the node device in a power-saving mode exiting the power-saving mode after detecting that a customer premise equipment starts reverse power supply to the node device; wherein, the step of the node device detecting that the customer premise equipment starts reverse power supply to the node device comprises:

the node device detecting that a reverse power supply voltage signal or a reverse power supply current signal provided by the customer premise equipment gradually rises, and rated power is output stably and continuously.

2. The method according to claim 1, wherein, the step of the node device entering the power-saving mode comprises: the node device turning off a transceiver of a port on the node device corresponding to the customer premise equipment.

3. The method according to claim 1, wherein, the condition of entering the power-saving mode comprises the node device detecting that the reverse power supply signal provided by the customer premise equipment disappears.

4. The method according to claim 3, further comprising:

when there is no service on a link for a period of time, the customer premise equipment corresponding to the link stopping providing the reverse power supply signal to the node device.

5. The method according to claim 1, further comprising:

when there is no service on a link for a period of time, the customer premise equipment corresponding to the link providing the reverse power supply signal to the node device intermittently according to a certain rule; wherein, the condition of entering the power-saving mode comprises the node device detecting that a period of the reverse power supply of the customer premise equipment changes.

6. The method according to claim 1, further comprising:

after the node device which exits the power-saving mode activates a port corresponding to the customer premise equipment, entering a normal operating mode through an initialization process.

7. A node device, comprising: a reverse power supply unit, a power source unit, a control unit, and a transceiver unit, wherein, the reverse power supply unit is configured to transfer a received reverse power supply signal provided by a customer premise equipment to the power source unit;

the control unit is configured to transmit a turn off command to the transceiver unit when detecting that characteristics of the reverse power supply signal provided by the customer premise equipment in the reverse power supply unit satisfy a condition of entering a power-saving mode; and the transceiver unit is configured to stop data transceiving of a port corresponding to the customer premise equipment after receiving the turn off command;

wherein the characteristics of the reverse power supply signal comprise one or more of a current level, a power level, and a period of the reverse power supply signal;

wherein, the condition of entering the power-saving mode comprises:

the control unit detecting that the reverse power supply signal provided by the customer premise equipment disappears; or the control unit detecting that power of the reverse power supply of the customer premise equipment reduces; or the control unit detecting that a period of the reverse power supply of the customer premise equipment changes.

8. The node device according to claim 7, wherein, the control unit is further configured to transmit a turn on command to the transceiver unit after detecting that the customer premise equipment starts reverse power supply to the node device in the power-saving mode; and the transceiver unit is further configured to enable the data transceiving of the port corresponding to the customer premise equipment after receiving the turn on command.

9. The node device according to claim 8, wherein, the control unit is configured to detect that the customer premise equipment starts reverse power supply to the node device in the power-saving mode by the following way:

the control unit detecting that a reverse power supply voltage signal or a reverse power supply current signal provided by the customer premise equipment gradually rises, and rated power is output stably and continuously.

* * * * *